Feb. 4, 1936.　　W. F. GROENE ET AL　　2,030,020
CHUCK
Filed Jan. 21, 1935　　6 Sheets-Sheet 1
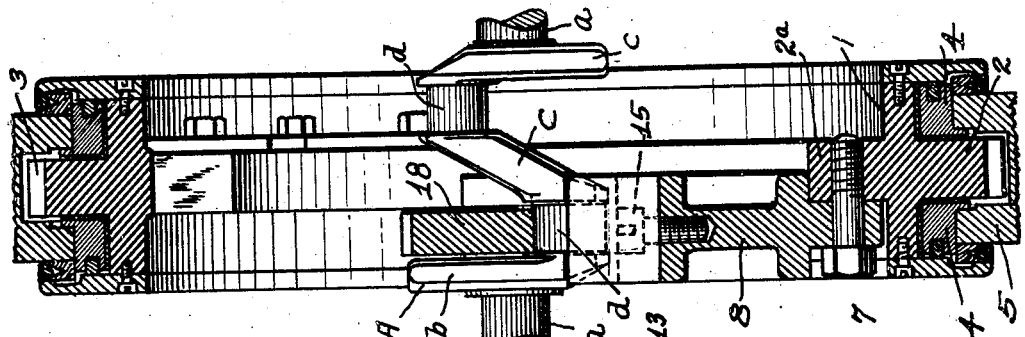
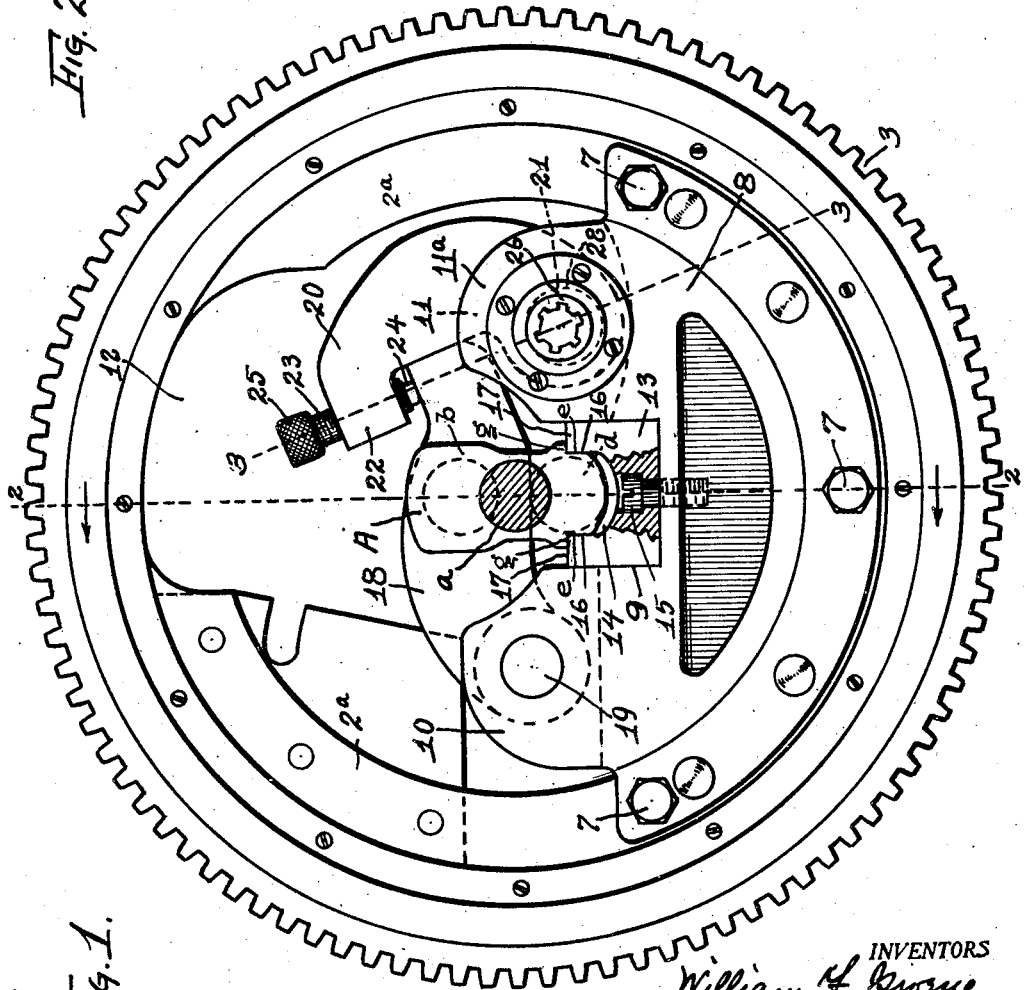
INVENTORS
William F. Groene
BY Walter R. Meyer
Allan & Allan
ATTORNEYS Feb. 4, 1936.  W. F. GROENE ET AL  2,030,020
CHUCK
Filed Jan. 21, 1935   6 Sheets-Sheet 2
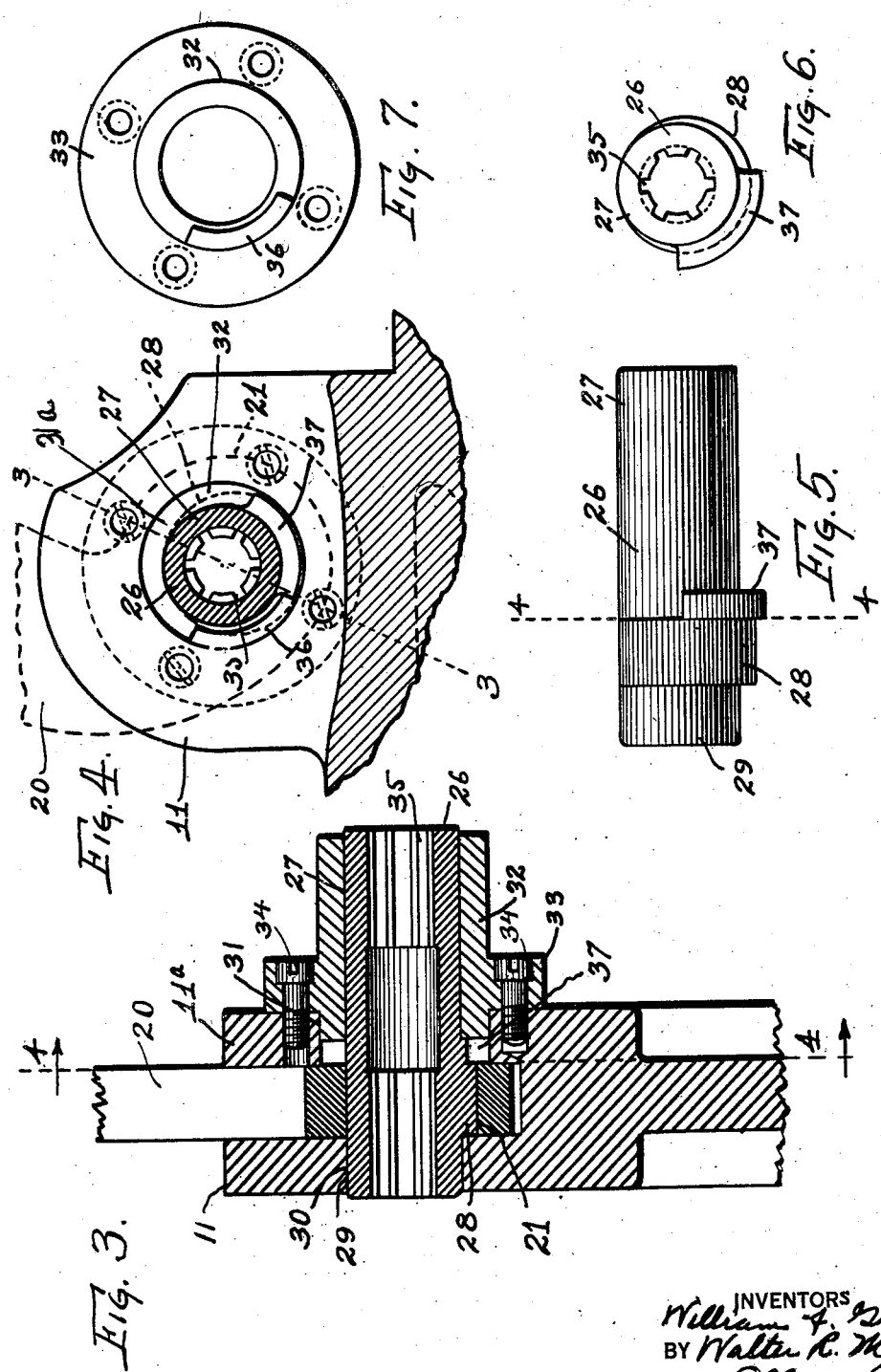
INVENTORS
William F. Groene
BY Walter R. Meyer
Allen & Allen
ATTORNEYS Feb. 4, 1936.  W. F. GROENE ET AL  2,030,020
CHUCK
Filed Jan. 21, 1935   6 Sheets-Sheet 3
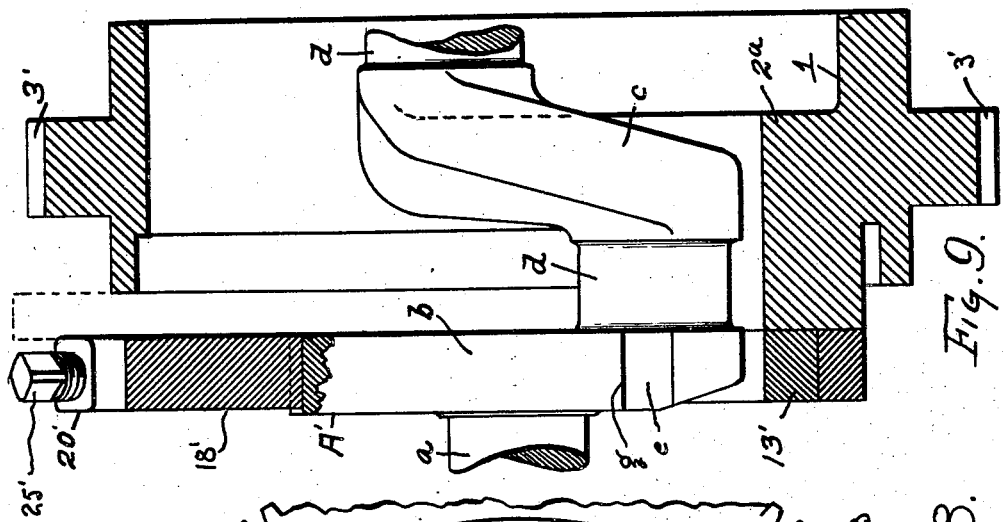
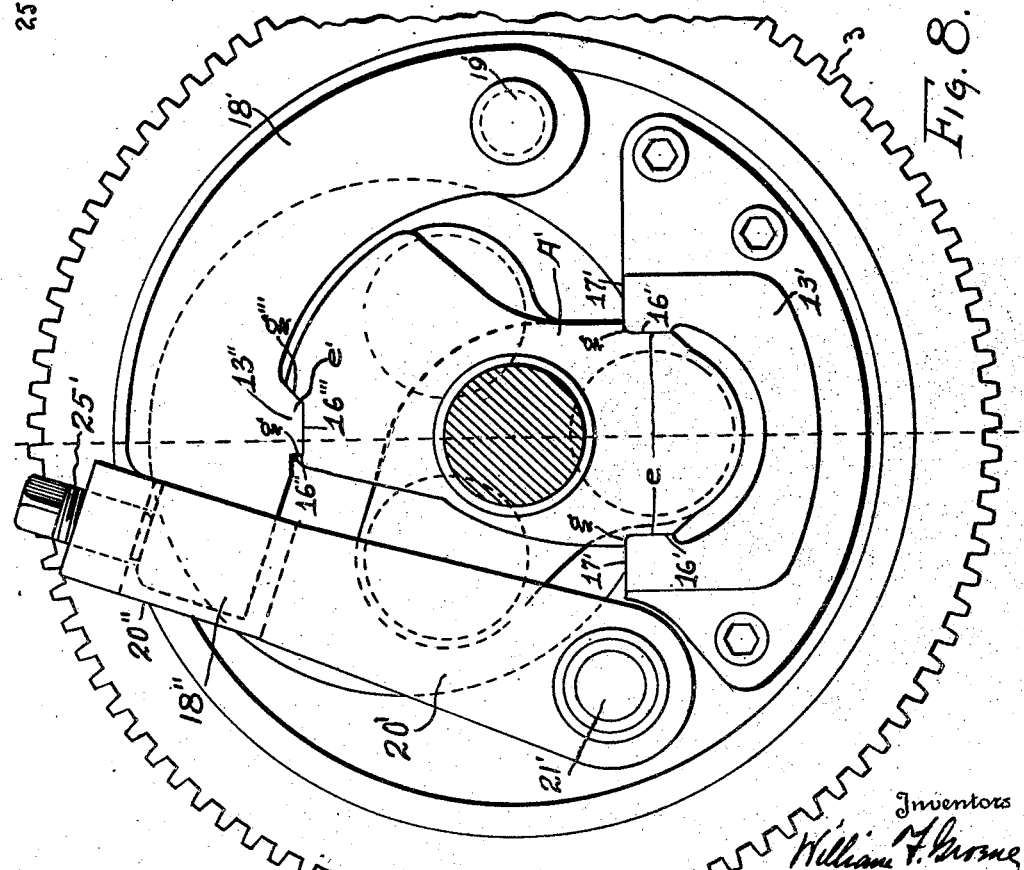
Inventors
William F. Groene
Walter R. Meyer
By Allen & Allen
Attorney

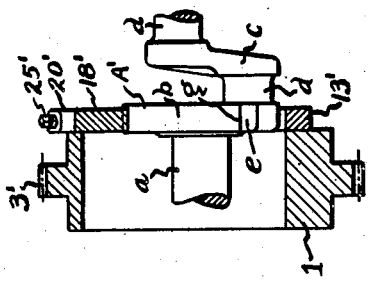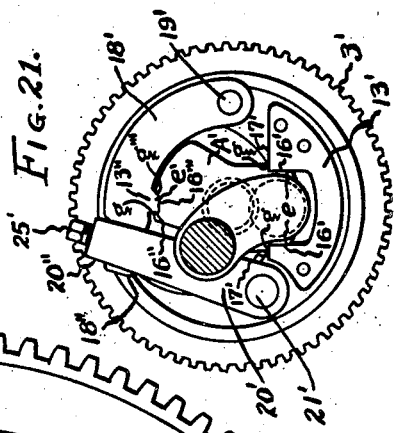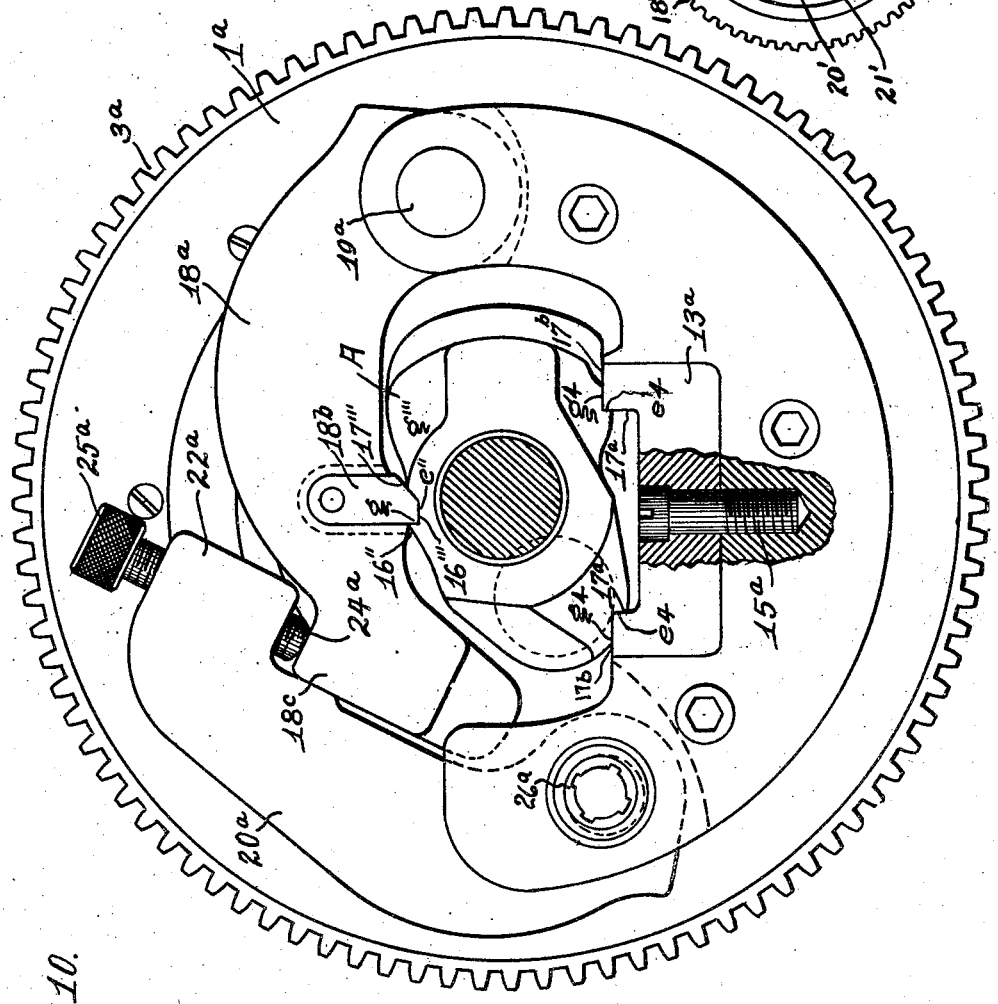

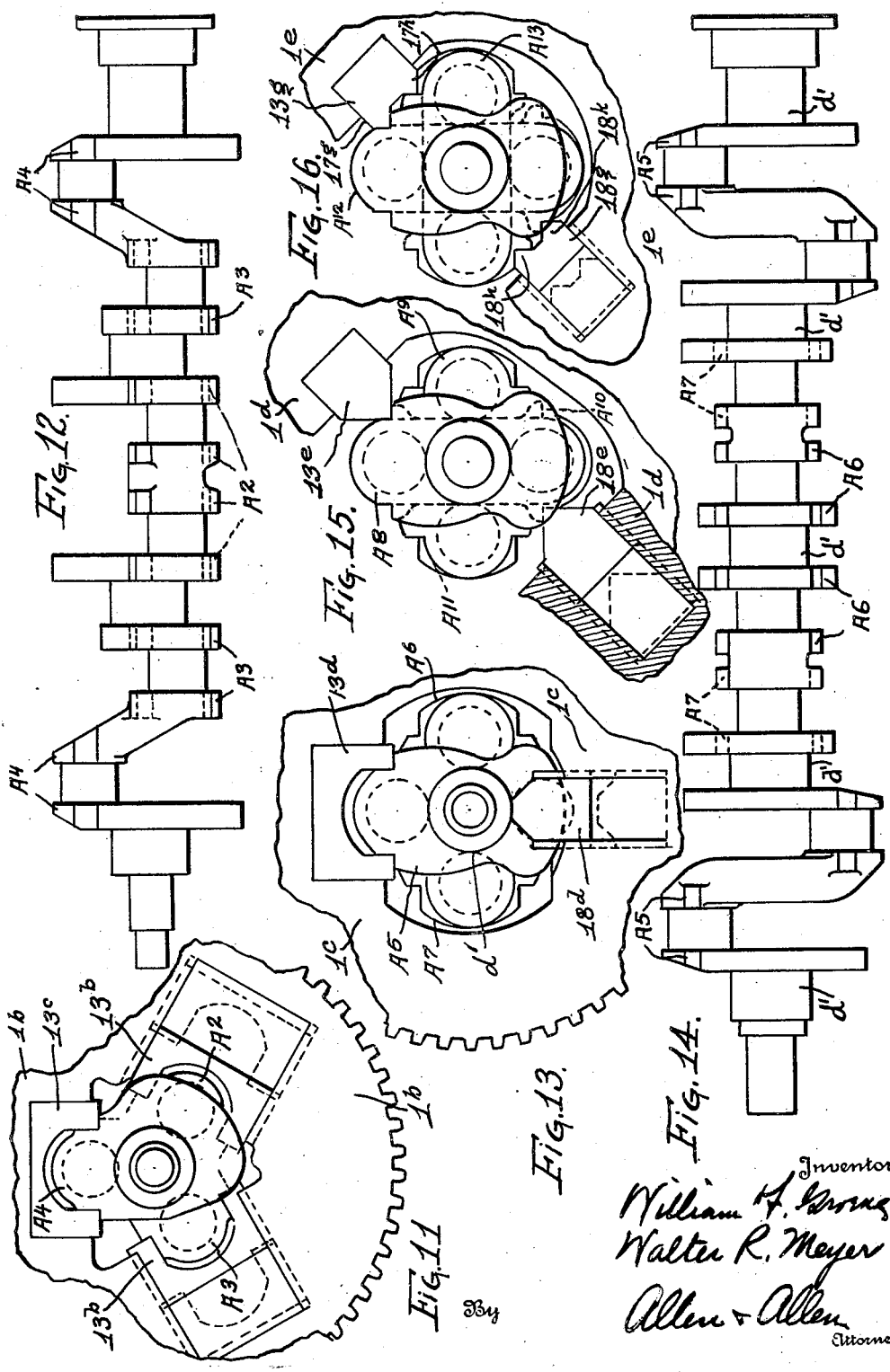

Feb. 4, 1936. W. F. GROENE ET AL 2,030,020
CHUCK
Filed Jan. 21, 1935 6 Sheets-Sheet 6
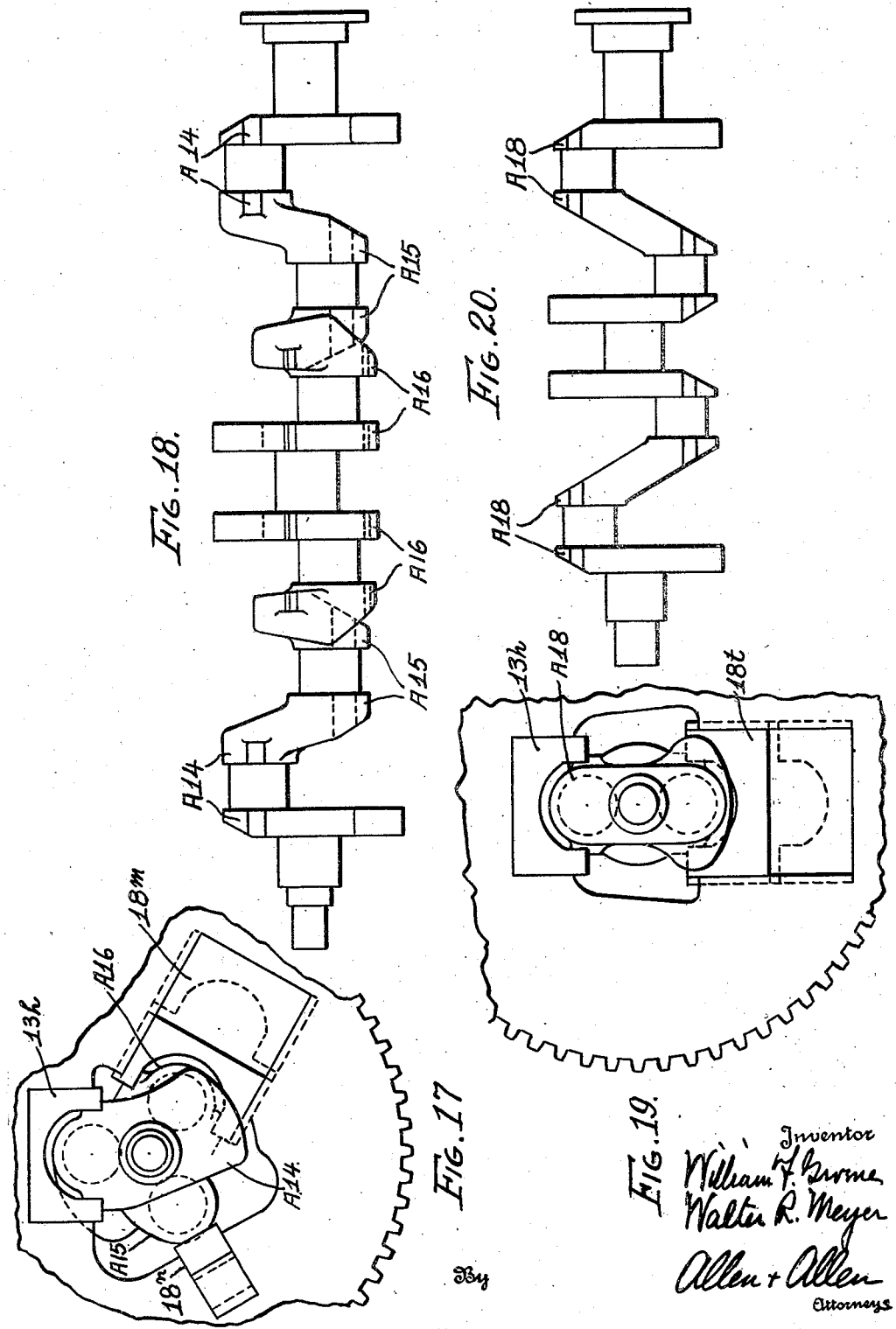

Patented Feb. 4, 1936

2,030,020

UNITED STATES PATENT OFFICE 2,030,020

CHUCK

William F. Groene and Walter R. Meyer, Cincinnati, Ohio, assignors to The R. K. Le Blond Machine Tool Company, Cincinnati, Ohio, a corporation of Delaware Application January 21, 1935, Serial No. 2,638

28 Claims. (Cl. 82—40)

Our invention relates to machine tool construction, and more especially to chucks for lathes or like machine tools. Our invention is more particularly concerned with the turning of the line bearings on automotive crank shafts; although it will be understood that our invention is not limited to use in turning crank shafts, though such a shaft will be taken for purposes of illustration of our invention herein.

An object of our invention is to center the work piece in the chuck and independently of the usual conical lathe centers that engage depressions in the ends of the work piece; although we prefer to locate the work piece lengthwise of the axis by such conical center pins engaging such depressions in the ends of the work piece.

An objection of centering a work piece such as a crank shaft solely by such conical lathe centers when these centers have to sustain the entire stress, not only by holding the work piece in location lengthwise of its axis, which stress is comparatively light, but also resisting the stress tending to move the work piece out of actual alinement with the chuck, is that the edges of the central depressions in the ends of the work piece, becoming distorted and worn under such stresses, will allow the shaft to move out of the center, particularly where heavy cuts are taken, as for instance, in rapid production of automotive crank shafts. It is our object, therefore, to hold the work piece in axial alinement with the chuck or chucks by engagement with portions of the work piece alongside or between those portions of the work piece which are to be turned; as for instance, in the case of automotive crank shafts, the engagement is with portions of the crank shaft webs, previously finished in accurate definite relation to the desired center of turning. In this respect our present invention relates to the inventions disclosed and claimed in Patent No. 1,843,359, of February 2, 1932, and reissue applications Serial No. 744,565, filed September 18, 1934, and Serial No. 748,720, filed October 17, 1934.

A further object of our invention is to facilitate firm clamping of the work piece in the chuck, by engagement with some part of the work piece alongside or between portions of the work piece that are to be turned.

A further object is to nicely adjust the clamping means for clamping the work piece with the correct pressure.

A further object is to provide for loading, centering the work piece, adjusting for correct clamping pressure and applying the pressure and locking the pressure applying means in firm condition all with facility and rapidity, as is desirable in rapid production.

As compared with our former patents above noted, it is characteristic of our present structure in its several forms that the act of placing a crank shaft into our chuck and applying the clamping force thereto is to locate the shaft exactly with reference to the center of the chuck, to bring it to an orientated position of definite relation to the chuck, i. e. to index the shaft, and finally to supply a driving face or faces which positively act to impart rotation to the work when the chuck is rotated.

Further objects will appear in the course of the following description in which:—

Fig. 1 is a face view of a chuck embodying our invention.

Fig. 2 is a diametrical section on the line 2—2 of Fig. 1.

Fig. 3 is a section through the eccentric clamping means, in the plane of the eccentric axis, on the line 3—3 of Figs. 1 and 4.

Fig. 4 is a cross section of the eccentric clamping means on the line 4—4 of Fig. 3.

Fig. 5 is a detailed side elevation of the eccentric.

Fig. 6 is a detailed end elevation of the same.

Fig. 7 is an end elevation of the bearing piece.

Fig. 8 is a view similar to Fig. 1, showing a modification of our invention.

Fig. 9 is a sectional side elevation of the same.

Fig. 10 is a view similar to Figs. 1 and 8, showing a second modification of our invention.

Figs. 11 to 20, inclusive, show several modifications of the application of our invention to crank shafts with various members of cranks and various forms of crank webs.

Figs. 21 and 22 are respectively a face elevation and a diametral cross section of the chuck shown in Figs. 8 and 9, holding a crank shaft for turning its crank pins.

We have shown in Figs. 21 and 22 the use of our chuck for turning the pins of the crank shaft, in which case it positively indexes the pins with a tool control means, such as the master cranks in an orbital lathe, such as shown, for instance, in the patent and applications above mentioned. Any example of our chuck shown herein is applicable to such use. However, except in Figs. 21 and 22 we have shown the shaft mounted for turning its line bearings.

In the example of Figs. 1 to 7, inclusive, the chuck body 1 is a ring of cross-shaped radial cross section, with an outer flange 2 and an inner flange 2a. The outer flange has the teeth 3, with which a pinion, not shown, meshes and connects the chuck to a suitable power source. This may be any usual lathe construction, or special construction, for turning line bearings, or the crank pins or other purposes. In the case of turning crank pins, the chuck would be geared to the master cranks of an orbital lathe, such as above mentioned; so that the chuck would be synchronized therewith. Bushings 4 form the journal bearings for the chuck; and suitable ring-shaped lubricant retaining means are secured to this ring gear or chuck body 1, lapping out past the bushings 4.

The interior flange 2a has secured to it by screws 7, a segmental clamp supporting a web 8. This web 8 has a rectangular recess 9 opening toward the center of the chuck. At one side of this recess 9, the web 8 has a pair of ears 10, and at the opposite side it has a pair of ears 11 and 11a. For some distance around the chuck, in the region opposite from that occupied by the web 8, the inner flange 2a is cut away leaving a segmental recess 12, affording ample space for inserting the work piece through the chuck, preparatory to bringing it down into centering position in the chuck.

The recess 9 in the web 8 is accurately formed; and the locating block 13 fits accurately in this recess. This locating block 13 presents a recess 14 toward the center line of the chuck; the block 13 being of a wide low U-shape. This block 13 is fixed in the recess 9 by a screw 15 passing through the bottom from the recess 14 into the web 8. The sides 16 of the recess 14 are accurately formed, as also are the ends 17 of the portions of the block 13 at the side of the recess 14. As here shown, the sides 16 are parallel with a diameter of the chuck median to the recess 14, and ends 17 are at right angles to the sides 16.

Fitting between the ears 10 is the clamp bar 18, mounted to swing on a pivot pin 19, passing through one end part of the bar 18 and into the ears 10. This clamp bar 18 is thus adapted to be swung across the locating block 13, or to be swung out away therefrom, to admit the work piece to the block 13.

Between the opposite pair of ears 11 and 11a is a latch member 20 having, in its end part between the ears 11 and 11a, a circular aperture 21. The other end part of this latch member 20 has an extension 22 adapted to extend across the free end of the clamp bar 18 when the latch member 20 is swung to this end of the bar 18. An adjusting screw 23 is threaded through this extension 22 to have an end 24 bearing against the end portion of the latch bar 18; the opposite end, outside the extension 22, having a knurled head 25 so that this screw may be turned by the thumb and finger.

The eccentric clamp member 26, shown in detail in Figs. 5 and 6, comprises a cylindrical body portion 27 which has intermediate of its ends but nearer one end than to the other, the circular portion 28, eccentric to the main body portion 27, and of diameter to fit accurately in and journal in the circular opening 21 of the latch member 20. The shorter portion 29 at one side of this eccentric part 28 journals in an opening 30 in the inner ear 11. The outer ear 11a has a larger opening 31, concentric with the opening 30; and a bearing member 32 fits in this opening 31, and has an outer annular flange 33 through which screws 34 pass, fixing this member 32 in the opening 31; this member 32 extending a considerable distance outward, to form the journal bearing for the longer portion of the body 27. By turning this eccentric member 26 the latch member 20 can be moved from a position in which it is free of or only lightly contacts the clamp bar 18, or to a position in which it holds the clamp bar 18 in clamping position; which latter is the position illustrated in the drawings. The cylindrical body of the eccentric clamping member 26 is of tubular shape, with interior portions adjacent opposite ends projected inwardly and having a series of spline grooves 35 in them, to receive a suitable splined wrench, not shown, for turning the member 26.

The clamp will be locked, when the clamp bar has engaged the work piece under action of eccentric member 26 and latch member 20, and the eccentric member 26 has brought its eccentric part 28 in alinement with the axis of the eccentric member and the place of engagement of screw 24 and with clamp bar 18. The bearing piece 32, where it fits into the opening 31, extends for only part of the length of this opening, except where it has a segmental stop lug 36 formed integral with it and projecting therefrom to the inner end of the opening 31. A space 31a is thus left in which a segmental lug 37, integral with the cylindrical body portion 27 of the eccentric clamp member 37 next to the eccentric portion 28 thereof, is free to move as the eccentric clamp member 37 is rotated. The lugs 36 and 37 are circumferentially long enough so that when one end of the lug 37 engages one end of the lug 36 the limit of clamping movement is made, and when the other end of the lug 37 engages the other end of the lug 36 the limit of unclamping movement is made.

A crank shaft, as the shaft A in Figs. 1 and 2, comprising line bearings $a$, webs $b$ and $c$, and crank pins $d$ between adjacent webs $b$ and $c$, has a pair of webs $b$ and $c$, that join a crank pin $d$, cut at opposite sides to form accurate locating areas $e$ and $g$. Areas $e$ face in opposite lateral directions, and are at a distance apart such that the portions of the webs $b$ and $c$ between them will fit snugly between the sides 16 of the recess 14 in the locating block 13. The portions $g$ will face along the portions $e$, and are accurately formed with relation to a proper center of pin bearing $d$, so that when these parts $g$ bear on the end parts 17 of the locating block 13, the line bearings $a$ will have a proper center in alinement with the chuck center. The proper center, as we here mean the term, is that which when so alined with the chuck axis will result in leaving a desired amount of material all around the portion that is to be turned, within limits determined by the amount of material provided on the crank shaft forging for finishing.

When the crank shaft thus is located on the block 13, the clamp bar 18 is swung across, the crank pin $d$ between the two webs $b$ and $c$ that are bearing on the block 13. The operator may now use the screw 23 to cause the latch member 20 to hold the clamp bar 18 against this crank pin $d$, with that degree of pressure which will result in the proper clamping pressure after the eccentric member 26 has been turned to full clamping position. As there is no visual way of telling when the eccentric has been turned to a point where latch member 20 is fully drawn down on clamp bar 18, the lugs 36 and 37 are provided so the operator may turn the eccentric until these lugs engage, thus locating this point, the screw 23 being adjusted so as not to contact clamp bar 18 when in this position. The operator then backs the eccentric away from this contact of 36 and 37 a suitable distance determined by experience of the operator so that when screw 23 is run lightly down to contact 18 and the eccentric again tightened the lugs 36 and 37 will not contact when the work is fully clamped. It will be understood that the screw 23 will be locked against turning, due to the heavy clamping pressure which it sustains.

In the example of Figs. 8 and 9, the eccentric is not used in the clamp; but the general arrangement of the clamp bar and the latch bar and the locating block is like that in Figs. 1 to 7, inclusive. The locating block 13' is unitary with the chuck body and is of flat U-shape, with the locating surfaces 16' on the inner sides of its members, and the locating surfaces 17' on the outer ends of its members, and accurately engaging with finished surfaces e and g, respectively, on the sides of one end part of the crank web A' as in the first example.

The clamp bar 18' is pivoted at 19' on the face of the chuck at one side, so as to swing across the axis of the chuck to clamp the work, or to swing out away therefrom to admit the work.

The latch bar 20' as here shown, is simply straight but has an opening 20" which receives the reduced free end part 18" of the clamp bar 18'. A clamp screw 25' is threaded in through the free end of the latch bar to engage the end part 18". The latch bar 20' is simply pivoted at 21' on the face of the chuck at the opposite side of the axis thereof to swing to or away from the clamp bar. In this example the clamping would be effected directly by screwing the clamp screw 25' inward.

The outstanding difference between this example and that of Figs. 1 to 7, inclusive, is the provision on the clamp bar 18' of an additional locating means 13", which is accurately engaged with accurately finished areas in a notch e' in the adjacent end of the crank web A'; that is in the end opposite to that end at the sides of which the locating surfaces e and g are formed. As here shown, one side of this locating means 13", at 16", is at right angles to the portion 16''' that engages the bottom of the notch e'; this side 16" engaging against a like disposed side g" of the notch, as seen at the left in Fig. 8. The opposite side 17''' of the locating means on the clamp bar 18' is inclined, as here shown at an angle of about 45 degrees, to the portion 16''', and fits against a like inclined side g''' of the notch e', seen at the right in Fig. 8. This inclination to the general direction of clamping pressure by the clamp bar 18' results in a wedging of the locating means into the accurately finished notch e', with an especially firm holding effect. Also the provision of tightly clamping locating means at this other end of the web, which locating means e' is seen to be in a plane median to the locating means 16' and 17' at the first described end of the web. This results in an especially even distribution of the clamping pressure to these two sets of locating area 16' and 17'; and in this respect, while we are not limited to this additional locating means, we consider it, therefore, some advantage over the use of locating means merely at one end of the web, as in the examples of Figs. 1 to 7, inclusive.

In the example of Fig. 10 the chuck is similar to that of Figs. 1 to 7, inclusive, in that it has the eccentric which is used to effect the actual clamping pressure, and has the screw for adjustment of the degree to which the eccentric will draw the clamp bar to the work. This example also is similar to that of Figs. 8 and 9 in that there is a locating block with two locating means at one side of the web, and the clamp bar also has a locating means engaging the opposite side of the web. That is to say the chuck body 1a with driving teeth 3a, has the locating block 13a with the outstanding portions each having areas 17a and 17b at right angles to each other, which accurately engage with accurately formed locating areas e4 and g4 on the adjacent side of the web A". This locating block 13a is secured in the chuck body by the screw 15a; and it will be seen that the block 13a, though not as deep as the one of Figs. 1 to 7, inclusive, may be said to be of U-shape.

The clamp bar 18a, pivoted at 19a between ears near one side of the chuck body, is adapted to swing across the work to clamp it, or to swing away to allow insertion and removal of the work. This clamp bar 18a has the locating piece 18b accurately fitted in it, and with its exposed end formed like the projection 13" on the clamp bar 18' of Figs. 9 and 10; having portions 16" and 16''' at right angles to each other to engage web surfaces g" and e", respectively, and the inclined surface 17''' to engage the inclined side g''' on the crank web A'. In this example, the clamping action is against surfaces on the sides of the web, rather than against surfaces on the end parts of the web; but it will be seen that the advantages are the same, in that the clamp bar applies an additional locating means remote from and along a line running between the other two locating means, and also, by the inclined surfaces 17''' and g''', exerting a wedging action, as described in connection with the example of Figs. 8 and 9.

The clamp bar 18a has an extension 18c on its free end, and the latch bar 20a has the eccentric connection 26a with the chuck body 1a between ears at the side opposite the pivoting of the clamp bar 18c; and, through a projection 22a on the free end of the latch bar 20a, the adjusting screw 25a is threaded, with its end portion 24a bearing against the clamp bar projection 18c. As the operation of this clamping means is the same as was described for the clamping means of Figs. 1 to 7, inclusive, the description need not be repeated.

In Fig. 11 a plurality of locating blocks 13b are shown mounted slidably in the chuck body 1b, only a part of this body being shown. Two of these slidable blocks 13b coact with a third block 13c, fixed in the body 1b. The several blocks 13b and 13c engage respective crank webs A2 A3 and A4 of a crank shaft such as that shown in Fig. 12; the several webs being spaced 120 degrees apart; and the blocks being arranged accordingly. It will be understood that the chuck may include suitable means for forcing the slidable blocks 13b into locating relation with the respective webs, after the webs have been located in the fixed blocks 13c.

In Fig. 13 is shown an application of our invention to the holding of a crank shaft, fully shown in Fig. 14, which has the crank pins and their webs 90 degrees apart. As seen in Fig. 13, one end of the web A5 has locating surfaces contacted by fixed locating block 13d, while a line bearing d' is contacted in the opposite direction by a slidable clamp block 18d. Both the locating block 13d and the clamp block 18d are mounted in the chuck body 1c, a part only of which is shown; and it will be understood that suitable means would be provided for forcing the clamp block 18d to the line bearing d'. It will be understood that the other crank webs A6 and A7 would be clamped in the same manner.

In Fig. 15, a crank shaft with pins 90 degrees apart, is held by a V-shaped locating block 13e engaging the accurately formed surfaces on one side of one end of the crank web A8, while a V-shaped clamp block 18e engages like surfaces at the diagonally opposite portion of the web; these parts being mounted in the chuck body 1d. It will be understood that means would be provided for forcing clamp block 18e to clamping position; and that like members would contact the other webs A9, A10 and A11 of the shaft.

In Fig. 16 the shaft has four crank pins 90 degrees apart, and the locating block 13g has spaced V-shaped portions 17g and 17h which engage, respectively, an accurately located surface at one side of one end of web A12 and a similar surface at the adjacent end of the next web A13. The slidable clamp block 18g is shaped similarly to the fixed block 13g with spaced members 18h and 18k, which engage respectively, accurately located surfaces on the webs A12 and A13 at the sides of the opposite ends of these webs. These members 13g and 18g are mounted in the chuck body 1e, and suitable means for forcing the block 18g to clamping position would be provided.

The shaft of any one of Figs. 13, 15 and 16 will be understood to be substantially as shown in side elevation in Fig. 14.

In Fig. 17, the shaft shown in Fig. 18 with crank pins 120 degrees apart, similar to that of Figs. 11 and 12, is held by one fixed locating block 13h which engages locating surfaces at both sides of one end of crank web A14, while slidable clamp blocks 18m and 18n are forced into clamping position, by means not shown, against crank pins of other webs A15 and A16, located 120 degrees from the pin of the web A14 that bears on the locating block 13h.

In Fig. 19, the locating block 13h engages accurately located surfaces on one end of web A18, and clamp block 18t, engages the opposite part of the shaft shown in Fig. 20.

While we have shown several examples of applications of our invention, and while we have rather specifically set forth the details of certain examples of construction of our invention, we do not wish to be understood as being limited to those examples or such precise disclosure, but what we claim as new and desire to secure by Letters Patent is:—

1. In a chuck comprising a rotatable chuck body, locating means at one side of the axis of rotation of the chuck body having fixed, interspaced areas accurately positioned relative to said axis for effective angularly related engagement with respective angularly related areas accurately located on opposite sides of a work piece relative to a proper center of turning of the work piece, the aggregate effective engagement of the areas at both sides serving both to locate the work piece with said proper center of turning in accurate alinement with said axis of rotation, and to index the work piece during rotation of said chuck, and means on said chuck body to clamp the work piece to said areas.

2. In a chuck comprising a rotatable chuck body, locating means at one side of the axis of rotation of the chuck body having fixed, interspaced areas accurately positioned relative to said axis for effective angularly related engagement with respective angularly related areas accurately located on opposite sides of a work piece relative to a proper center of turning of the work piece, the aggregate effective engagement of the areas at both sides serving both to locate the work piece with said proper center of turning in accurate alinement with said axis of rotation, and to index the work piece during rotation of said chuck, and means on said chuck body to clamp the work piece to said areas, at least one of said means having its areas at a substantial angle to each other, whereby each one of said areas is adapted to have said effective engagement with areas correspondingly at an angle to each other on the respective side of the work piece.

3. In a chuck comprising a rotatable chuck body, locating means at one side of the axis of rotation of the chuck body having fixed, interspaced areas accurately positioned relative to said axis for effective angularly related engagement with respective angularly related areas accurately located on opposite sides of a work piece relative to a proper center of turning of the work piece, the aggregate effective engagement of the areas at both sides serving both to locate the work piece with said proper center of turning in accurate alinement with said axis of rotation, and to index the work piece during rotation of said chuck, and means on said chuck body to clamp the work piece to said areas, the means at each side of said axis having its areas at a substantial angle to each other, whereby each one of said areas is adapted to have said effective engagement with areas correspondingly at an angle to each other on the respective side of the work piece.

4. In a chuck comprising a rotatable chuck body, locating means at one side of the axis of rotation of the chuck body having fixed, interspaced areas accurately positioned relative to said axis for effective oppositely directed engagement with respective areas accurately located on opposite sides of a work piece relative to a proper center of turning of the work piece, the aggregate effective engagement of the areas at both sides serving both to locate the work piece with said proper center of turning in accurate alinement with said axis of rotation, and to index the work piece during rotation of said chuck, and means on said chuck body to clamp the work piece to said areas, comprising a clamp bar having a movable connection to said chuck body at one side of said axis, whereby it may be moved to a position across a portion of the work piece or moved from said position, and latch means operatively mounted at the other side of said axis and comprising a device to engage the clamp bar, when the clamp bar is across the work piece, said latch means including mechanism to effect movement of the clamp bar into clamping relation to the work piece, and said device being adjustable to vary the degree of said movement.

5. In a chuck comprising a rotatable chuck body, locating means at one side of the axis of rotation of the chuck body having fixed, interspaced areas accurately positioned relative to said axis for effective oppositely directed engagement with respective areas accurately located on opposite sides of a work piece relative to a proper center of turning of the work piece, the aggregate effective engagement of the areas at both sides serving both to locate the work piece with said proper center of turning in accurate alinement with said axis of rotation, and to index the work piece during rotation of said chuck, and means on said chuck body to clamp the work piece to said areas, comprising a clamp bar having a movable connection to said chuck body at one side of said axis, whereby it may be moved to a position across a portion of the work piece or moved from said position, and latch means operatively mounted at the other side of said axis and comprising a device to engage the clamp bar, when the clamp bar is across the work piece, said latch means including mechanism to effect movement of the clamp bar into clamping relation to the work piece, and said device being adjustable to vary the degree of said movement, said mechanism including an eccentric which tightens or releases the clamp bar according to the direction in which it is turned.

6. In a chuck comprising a rotatable chuck body, locating means at one side of the axis of rotation of the chuck body having interspaced areas accurately positioned relative to said axis for effective oppositely directed engagement with respective areas accurately located on opposite sides of a work piece relative to a proper center of turning of the work piece, the aggregate effective engagement of the areas at both sides serving both to locate the work piece with said proper center of turning in accurate alinement with said axis of rotation, and to index the work piece during rotation of said chuck, and means on said chuck body to clamp the work piece to said areas, said locating means being a unitary member of approximate U-shape, with the ends of the U-shape having said areas of effective engagement with the work piece.

7. In a chuck comprising a rotatable chuck body, locating means at one side of the axis of rotation of the chuck body having interspaced areas accurately positioned relative to said axis for effective oppositely directed engagement with respective areas accurately located on opposite sides of a work piece relative to a proper center of turning of the work piece, the aggregate effective engagement of the areas at both sides serving both to locate the work piece with said proper center of turning in accurate alinement with said axis of rotation, and to index the work piece during rotation of said chuck, and means on said chuck body to clamp the work piece to said areas, the means at each side of said axis having its areas at a substantial angle to each other, whereby each one of said areas is adapted to have said effective engagement with areas correspondingly at an angle to each other on the respective side of the work piece, said locating means being a unitary member of approximate U-shape, with the mutually facing end portions thereof constituting one set of areas and outer end portions thereof constituting the other set of areas which are at substantial angles to the first mentioned set of areas.

8. In a chuck comprising a rotatable chuck body, locating means at one side of the axis of rotation of the chuck body having fixed, interspaced areas accurately positioned relative to said axis for effective oppositely directed engagement with respective areas accurately located on opposite sides of a work piece relative to a proper center of turning of the work piece, the aggregate effective engagement of the areas at both sides serving both to locate the work piece with said proper center of turning in accurate alinement with said axis of rotation, and to index the work piece during rotation of said chuck, and means on said chuck body to clamp the work piece to said areas, comprising a clamp bar pivoted to the chuck body at one side of said axis to swing to a position across the work piece or away from said position, and including a latch bar at the opposite side of said axis and means having surfaces which are eccentric to each other, with one surface bearing on the chuck body and the other surface in the latch bar, and the latch bar having means to engage the clamp bar when the clamp bar is across the work piece, so as to draw the clamp bar to the work piece or release it therefrom, accordingly as the means with the eccentric surfaces is turned one way or other.

9. In a chuck comprising a rotatable chuck body, locating means at one side of the axis of rotation of the chuck body having fixed, interspaced areas accurately positioned relative to said axis for effective oppositely directed engagement with respective areas accurately located on opposite sides of a work piece relative to a proper center of turning of the work piece, the aggregate effective engagement of the areas at both sides serving both to locate the work piece with said proper center of turning in accurate alinement with said axis of rotation, and to index the work piece during rotation of said chuck, and means on said chuck body to clamp the work piece to said areas, comprising a clamp bar pivoted to the chuck body at one side of said axis to swing to a position across the work piece or away from said position, and including a latch bar at the opposite side of said axis and means having surfaces which are eccentric to each other, with one surface bearing on the chuck body and the other surface in the latch bar, and the latch bar having means to engage the clamp bar when the clamp bar is across the work piece, so as to draw the clamp bar to the work piece or release it therefrom, accordingly as the means with the eccentric surfaces is turned one way or other, the latch bar means which engages the clamp bar being adjustable to vary the degree in which the clamp bar is drawn to the work piece by the operation of the means with the eccentric surfaces.

10. In a chuck comprising a rotatable chuck body, locating means at one side of the axis of rotation of the chuck body having fixed, interspaced areas accurately positioned relative to said axis for effective oppositely directed engagement with respective areas accurately located on opposite sides of a work piece relative to a proper center of turning of the work piece, the aggregate effective engagement of the areas at both sides serving both to locate the work piece with said proper center of turning in accurate alinement with said axis of rotation, and to index the work piece during rotation of said chuck, and means on said chuck body to clamp the work piece to said areas, comprising a clamp bar mounted on the chuck body at one side of the axis for movement into a position across the work piece or out of said position, a latch bar at the opposite side of said axis having means for engagement with the clamp bar when the clamp bar is across the work piece, and means connecting the clamp bar to the chuck body comprising a member which is journaled in the chuck body and having a unitary eccentric portion bearing in an opening in the latch bar, whereby rotation of the member moves the latch bar to draw the clamp bar to the work piece or release it therefrom.

11. In a chuck comprising a rotatable chuck body, locating means at one side of the axis of rotation of the chuck body having fixed, interspaced areas accurately positioned relative to said axis for effective oppositely directed engagement with respective areas accurately located on opposite sides of a work piece relative to a proper center of turning of the work piece, the aggregate effective engagement of the areas at both sides serving both to locate the work piece with said proper center of turning in accurate alinement with said axis of rotation, and to index the work piece during rotation of said chuck, and means on said chuck body to clamp the work piece to said areas, comprising a clamp bar mounted on the chuck body at one side of the axis for movement into a position across the work piece or out of said position, a latch bar at the opposite side of said axis having means for engagement with the clamp bar when the clamp bar is across the work piece, and means connecting the clamp bar to the chuck body comprising a member which is journaled in the chuck body and having a unitary eccentric portion bearing in an opening in the latch bar, whereby rotation of the member moves the latch bar to draw the clamp bar to the work piece or release it therefrom, said member having the eccentric portion also having a suitable lug unitary with it and a stop lug unitary with the chuck body, to be engaged by the stop lug of said member to limit the rotation of said member.

12. A chuck as set forth in claim 1, in which, with the chuck holding a work piece for finishing a cylindrical surface displaced radially from the chuck axis, the aggregate effective engagement of the areas at both sides serves to locate the work piece with said cylindrical portion properly indexed with a rotating device synchronized with the chuck rotation, and which applies a cutting tool to said cylindrical portion.

13. A chuck as set forth in claim 2, in which, with the chuck, holding, as therein defined, a work piece which has a cylindrical portion radially displaced from the axis of the chuck for finishing by a tool guided by suitable means, rotating synchronously with the chuck, serves, by mutual engagement of certain areas on the chuck and certain areas on the work piece, to index said cylindrical surface with said rotatable means.

14. In a chuck comprising a rotatable chuck body, fixed spaced locating means at one side of the axis of rotation of the chuck body, and at least one movable locating means at the opposite side of said axis, each one of said locating means having areas accurately positioned relative to said axis for engagement with respective areas accurately formed on a work piece at locations correspondingly related to a proper center of turning of the work piece, the engagement of the fixed locating means being directed oppositely to each other, and that of the movable locating means being directed oppositely to the fixed locating means, and the aggregate effective engagement of the areas serving both to locate the work piece with said proper center of turning in accurate alinement with said axis of rotation, and to index the work piece during rotation of the chuck, and means on said chuck body, associated with one of said movable locating means, to clamp the areas of the locating means and the areas of the work piece in effective work holding engagement.

15. A chuck as set forth in claim 14, in which one of said locating means has an area inclined to the general direction of clamping pressure, to engage a correspondingly inclined area on the work piece, whereby a wedging action is produced to increase the effective holding engagement.

16. A chuck as set forth in claim 14, in which the clamping means includes a clamp bar, and in which one of the locating means is carried by said clamp bar.

17. In a chuck comprising a rotatable chuck body, fixed locating means spaced apart at one side of the axis of rotation of the chuck body, each having areas accurately positioned relative to said axis and disposed at a substantial angle to each other, for engagement with respective correspondingly angularly related areas formed on a work piece at locations in corresponding relation to a proper center of turning of the work piece, and means on said chuck body at the opposite side of said axis, comprising locating means to engage a correspondingly located area accurately formed on a portion of the work piece beyond its proper center of turning from the first mentioned areas, this last mentioned locating means having an engaging area substantially inclined to a general direction of pressure to clamp the work piece between the locating means, whereby to engage a correspondingly inclined area on the work piece, so as to provide a wedging action to increase the effective clamping, and means on said chuck body, associated with the locating means at one side of the chuck axis, for effecting said clamping pressure.

18. A chuck as set forth in claim 14, in which a locating means at one side of the chuck axis is disposed in a line of clamping pressure which is median to the spaced apart locating means at the other side of the axis.

19. In a chuck comprising a rotatable chuck body, locating means at one side of the axis of rotation of the chuck body having an area accurately positioned relative to said axis for effective engagement with a corresponding area accurately located on a work piece relative to a proper center of turning of the work piece, the contacting surfaces of the locating means and work piece being so disposed that when they are held firmly together they locate the work piece with said proper center of turning in accurate alinement with said axis of rotation, a second locating means on said chuck body beyond the center of rotation thereof from the first mentioned locating means and having a surface inclined to a direction of effective pressure clamping the work piece between the two locating means, whereby the second locating means has a wedging effect against the work piece to hold it towards the first mentioned locating means, and means on said chuck body for effecting the clamping pressure.

20. A chuck as set forth in claim 14, in which the clamping means comprises a clamp bar carrying the second mentioned locating means, and a latch bar having means for effective engagement with the chuck body and means for effective engagement with the clamp bar, one of said means being operable to move the clamp bar to effect the clamping of the work piece and the locating means together as therein set forth.

21. A process of treating unmachined crankshafts having webs, and bearings including axially aligned line bearings and axially displaced pin bearings, which comprises machining on said webs, at interspaced positions in the length of said work piece, interspaced work locating portions upon the same side of an axis of said work piece, at least one of said portions having divergently disposed work locating faces, chucking said work in center drive chucks, simultaneously finishing all of one type of said bearings, afterward rechucking said piece and finishing all of another type of said bearings, in said first chucking operation, said work piece being located and indexed solely by the engagement of each of said work locating faces with work locating abutments on said chucks fixed with respect to the center of rotation of said chucks and the clamping of said webs thereagainst, and in said second chucking operation said work locating portions serving at least an indexing function.

22. A process of treating unmachined crankshafts having webs, axially aligned line bearings and axially displaced pin bearings, which comprises machining on said webs, at interspaced positions in the length of said work piece, interspaced work locating portions upon the same side of an axis of said work piece, at least one of said portions having divergently disposed work locating faces, and chucking said work piece in a plurality of center drive chucks having locating abutments fixed with respect to the center of rotation of said chucks and engaging said work locating faces, and means to clamp said webs thereagainst, said locating means being the sole means for locating and indexing said work piece in said chucks.

23. A process of treating crankshafts, or the like, having webs and bearing members comprising concentric line bearings and axially displaced pins, said process comprising machining on said webs at interspaced positions in the length of said work piece, interspaced work-locating portions, each portion located upon the same side of an axis of said piece, at least one of said portions having divergently disposed faces, chucking said work piece in center drive chucks intermediate the ends thereof by locating said work piece solely by means of said faces on locating members on said chucks fixed with respect to the center of rotation of said chucks and clamping said web thereagainst, so that a plurality of said bearings may be finished at one time, afterward rechucking said piece so as to finish others of said bearings at one time, in said first chucking operation, at least said locating faces serving both to position and to index said piece.

24. A process of treating crankshafts, or the like, having webs, and bearings including axially aligned line bearings and axially displaced pins, which process comprises machining on at least one of said webs, interspaced work locating portions each located upon the same side of an axis of said work piece and at least one of said portions having divergently disposed work locating faces, so that said work piece may be chucked in a center drive chuck intermediate its ends and located and indexed in said chuck solely by the engagement of said work locating faces with work locating abutments on said chuck fixed with respect to the center of rotation of said chuck and the clamping of said webs thereagainst, with said pins exposed for pin turning or said line bearings exposed for line turning, whereby a plurality of said bearings may be finished at one time.

25. In a chuck for crank shaft lathes, the combination with a rotary chuck body of fixed abutment means thereon definitely located relatively to the axis of the chuck and located to one side of said axis, said abutment means forming areas arranged for engagement with areas on the web of the shaft to be turned, which areas are effectively widely spaced on said web, and at one position on said web at least include two areas, one at an angle to the other, whereby when said shaft is clamped thereagainst, a fixed, predetermined relation of the shaft with the chuck body is assured and whereby the said abutment means constitute the driving and hence the indexing means for the shaft to be turned, as well as the locating means therefor, and means on the chuck body for clamping said web in place.

26. In a chucking device for crank shafts, in combination with a rotary chuck body, fixed abutment means for contacting machined portions on an irregular crank shaft web, and cooperating clamping means, said fixed abutment means having face portions so related as to center the crank shaft by means of its web, at least one face portion being so related to the radius of the chuck as to have an indexing and driving function, said faces all being located to one side of the axis of said chuck so as to permit final placement of the crank shaft by a transverse movement against said faces, and said clamping means acting in a direction to force said web against all of said faces.

27. In a chuck for crank shaft lathes, the combination of a rotary chuck body having clamping means for engaging and urging a shaft to be turned in a given direction, and abutment means in said body opposing the clamping means and fixed with relation to the chuck body, said abutment means comprising mutually opposing faces on opposite sides of the line of clamping direction and at one of said sides at least including two faces angularly related to each other.

28. In a chuck for crank shaft lathes, the combination of a rotary chuck body including clamping means and fixed abutment means presenting to a crank shaft web when the crank shaft is gripped between them, certain web engaging faces of restricted area so related to a preformed shaft web as to engage matching faces machined thereon, at least three faces being provided, at least one face being a driving face, and the gripping force being directionally confined to enforcing said facial engagement, no element of the force in enforcing one facial engagement opposing the enforcement of other facial engagements.

WILLIAM F. GROENE.
WALTER R. MEYER.